United States Patent [19]

Allen

[11] Patent Number: 4,938,800

[45] Date of Patent: Jul. 3, 1990

[54] ALCOHOL PRINTING SOLUTION WITH REDUCED FUME EMISSION

[76] Inventor: Richard Allen, 103 Turnwwod La., Winston-Salem, N.C. 27104

[21] Appl. No.: 170,267

[22] Filed: Mar. 18, 1988

[51] Int. Cl.[5] .................................................. C09K 3/18

[52] U.S. Cl. ........................................ 106/2; 101/451; 101/472

[58] Field of Search .................... 106/2; 430/304, 309; 101/451, 472

[56] References Cited

U.S. PATENT DOCUMENTS 4,053,319 10/1977 Nadeau et al. .......................... 106/2

*Primary Examiner*—Amelia Burgess Yarbrough

*Attorney, Agent, or Firm*—Wigman & Cohen

[57] ABSTRACT

Alcohol solutions for use as fountain solutions in the printing industry are disclosed. The solutions include isopropyl alcohol in amounts of 40% to 95%, ethyl alcohol or other alcohols in amounts of 5% to 60% and ethylene diamine in an amount of 0.015% to 0.040%. The addition of a small amount of ethylene diamine markedly reduces the emission of fumes from the fountain solutions.

5 Claims, No Drawings

ALCOHOL PRINTING SOLUTION WITH REDUCED FUME EMISSION

FIELD OF THE INVENTION

This invention relates to the treatment or modification of alcohols suitable for use in lithography and areas that employ alcohol as either a wetting agent or solvent.

BACKGROUND OF THE INVENTION

Alcohol solutions (alcohol and water), are used extensively in the printing industry as a wetting or moistening agent for printing plates. The solution is applied to the "non-image" area of the printing plate, and acts as a result to prevent ink from adhering to the non-image portion of the printing plate.

U.S. Pat. No. 4,013,008 describes the use and purposes of "dampening water" which is normally termed a fountain solution because it is carried on the press in a fountain pan. This patent discloses at column 1, lines 4 to 24 as follows: "The non-image portion of the plate is essentially bare metal. The printing plates are bound and tightly clamped around a cylinder generally termed a 'printing cylinder.' In use, the plate is 'dampened' by applying, through a dampener roller or other dampener system, a thin sheet of water to the plate with each revolution of the printing cylinder. Greasy inks are then applied to the plate, usually by means of a roller in contact with the printing cylinder. The greasy ink is attracted to the greasy image regions of the plate, and is repelled by the water-sheeted bare metal portions of the plate. Similiarly, the water applied to dampen the plate is attracted to the sheets over the bare metal portions thereof but is repelled by the greasy image portions thereof." The patent also teaches the use of isopropyl alcohol in the fountain solution to improve the wetting qualities.

U.S. Pat. No. 4,278,467 to Fadner teaches substitute additives for isopropyl alcohol in a fountain solution for lithographic offset printing so as to avoid the adverse toxic and flammable properties of fountain solutions containing isopropyl alcohol.

Alcohols are also used in various inks, and other coatings as a solvent to control viscosity and drying characteristics.

Alcohols used in the printing industry have a major deficiency because of the amount of emissions which naturally occur because of the low boiling point and inherent volatility of alcohols. Isopropyl alcohol, for example, is toxic and flammable resulting in health, fire and safety hazards in the workplace.

SUMMARY AND OBJECTS OF THE INVENTION

According to a primary aspect of the invention, an alcohol printing solution can be changed or modified by increasing the viscosity to retard evaporation. According to a preferred embodiment of the invention, the modification is accomplished by introducing ethylene diamine to a blend of two related alcohols in appropriate ratios. When an alcohol printing solution is so modified, the rate of evaporation is decreased.

It is an object of this invention to provide a method and composition for increasing the viscosity of alcohols to retard the rate of evaporation and reduce the amount of fumes emitted into the atmosphere.

It is another object of the invention to provide a solution for printing plates which is characterized by less saturation and waterlogging of ink when used as an ink resist and printing plate moistener.

These and other objects of the invention will be apparent from the following description of the preferred embodiments and the appended claims.

DESCRIPTION OF THE PREFERRED EMBODIMENTS

In the preparation of alcohol fountain solutions according to the present invention, isopropyl alcohol is admixed with ethyl alcohol or any other alcohol and a small (less than 1%) amount by weight of ethylene diamine. The most effective range of the admixture of the two alcohols is from 95% by weight isopropyl alcohol and 5% by weight ethyl alcohol or other alcohol to 40% by weight isopropyl alcohol and 60% by weight ethyl alcohol or other alcohol and ethylene diamine in an amount from 0.015% to 0.040% by weight and preferably in an amount from 0.015% to 0.025% by weight.

The following examples are illustrative of the results of fume emission tests of alcohol fountain solutions according to the invention.

EXAMPLE 1

A aqueous fountain solution of about 40% isopropyl alcohol and about 60% ethyl alcohol and 0.025% ethylene diamine was prepared. A 50 milliliter sample of this fountain solution and a 50 milliliter sample of isopropyl alcohol were allowed to stand in 400 milliliter beakers for one hour at ambient temperature (21° C.). One milliliter vapor samples were then drawn off at a level 3 inches above the solutions and were analyzed by FID gas chromotography. The relative concentration of the vapor over the fountain solution of the invention was 76.5% less than that of the isopropyl alcohol. Viscosity of the fountain solution was 86 or 14% more viscous than isopropyl alcohol.

EXAMPLE 2

A fountain solution of about 75% isopropyl alcohol, 15% Water and 10% ethyl alcohol with ethylene diamine in an amount of 0.015% was prepared. A sample of this fountain solution and a sample of isopropyl alcohol were allowed to stand in open beakers for one hour at ambient temperature. Vapor samples were then drawn off from the headspace over the samples and analyzed by gas chromotography. The relative concentration of vapor over the fountain solution was 37% less than that of the isopropyl alcohol. Viscosity of the fountain solution was 0.91 or 9% more viscous than isopropyl alcohol.

EXAMPLE 3

An aqueous fountain solution of about 80% isopropyl alcohol, 10% water and 10% ethyl alcohol with ethylene diamine in an amount of 0.015% was prepared. A sample of this fountain solution and a sample of isopropyl alcohol were allowed to stand in open beakers for one hour at ambient temperature. Vapor samples were then drawn from the headspace over the samples and analyzed by gas chromotography. The relative concentration of vapor over the fountain solution was 35% less than that of the isopropyl alcohol. Viscosity was not determined.

Some advantages of the fountain solutions according to the present invention are as follows:

1. By reason of the substitution of ethyl alcohol for a portion of the isopropyl alcohol, the overall toxicity of the blend is less than isopropyl alcohol alone and the resultant vapor or fume emission is less harmful to people and the environment.
2. Lower fume emission means that the fountain solution will last longer because it does not evaporate as quickly.
3. When used as a wetting agent in the printing industry, the higher viscosity results in less ink waste because of a dramatic reduction in the intrusion of water into the ink and thus less emulsification of the ink. Emulsified ink cannot be used for printing and is therefore waste ink.

Although only preferred embodiments are described herein, it should be understood that many modifications may be made to the invention without departing from the spirit and intended scope of the invention as defined in the appended claims.

What is claimed is:

1. A fountain solution consisting essentially of isopropyl alcohol, another alcohol, water and ethylene diamine in an amount of less than 1% by weight, the amount of said ethylene diamine being effective to reduce the fume emission and increase the viscosity of the fountain solution.

2. An alcohol-based fountain solution comprising isopropyl alcohol, another alcohol and ethylene diamine in an amount of 0.040% or less by weight, the amount of said ethylene diamine being effective to reduce the fume emission and increase the viscosity of the fountain solution.

3. The fountain solution according to claim 2 wherein said another alcohol is ethyl alcohol.

4. The fountain solution according to claim 3 wherein said isopropyl alcohol is in an amount of about 40% to 95% and said ethyl alcohol is in an amount of about 60% to 5% by weight.

5. The fountain solution according to claim 2 including water.

* * * * *